United States Patent
Kondo et al.

(10) Patent No.: US 9,528,477 B2
(45) Date of Patent: Dec. 27, 2016

(54) SOUNDPROOF COVER FOR FUEL PIPE

(71) Applicant: Sumitomo Riko Company Limited, Aichi (JP)

(72) Inventors: Hiroyuki Kondo, Aichi (JP); Kazuki Era, Aichi (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 14/971,075

(22) Filed: Dec. 16, 2015

(65) Prior Publication Data

US 2016/0097357 A1 Apr. 7, 2016

Related U.S. Application Data

(63) Continuation of application No. PCT/JP2013/073330, filed on Aug. 30, 2013.

(51) Int. Cl.
| | |
|---|---|
| *G10K 11/16* | (2006.01) |
| *F02M 37/00* | (2006.01) |
| *F16L 57/00* | (2006.01) |
| *F16L 55/033* | (2006.01) |

(52) U.S. Cl.
CPC ......... *F02M 37/0017* (2013.01); *F16L 55/033* (2013.01); *F16L 57/00* (2013.01); *F02M 2200/09* (2013.01)

(58) Field of Classification Search
CPC ....................................................... G10K 11/16
USPC ....................................................... 181/205
See application file for complete search history.

(56) References Cited

U.S. PATENT DOCUMENTS

| | | | | |
|---|---|---|---|---|
| 7,441,533 | B1* | 10/2008 | Miller | F02F 7/006 123/198 E |
| 2002/0170775 | A1* | 11/2002 | Stein | B29C 45/14467 181/204 |
| 2003/0010566 | A1* | 1/2003 | Miyakawa | F02M 35/10301 181/204 |
| 2003/0102182 | A1* | 6/2003 | Chen | F01N 13/102 181/205 |
| 2005/0082111 | A1* | 4/2005 | Weber | B60R 13/08 181/204 |

FOREIGN PATENT DOCUMENTS

| | | |
|---|---|---|
| JP | 62-26761 | 2/1987 |
| JP | 2002-168373 | 6/2002 |
| JP | 2005-282836 | 10/2005 |

OTHER PUBLICATIONS

International Search Report issued in PCT/JP2013/073330, dated Nov. 26, 2013.

* cited by examiner

*Primary Examiner* — Forrest M Phillips
(74) *Attorney, Agent, or Firm* — Greenblum & Bernstein, P.L.C.

(57) ABSTRACT

A soundproof cover for a fuel pipe includes a cover body and a clip. The cover body covers a fuel pipe. The clip is coupled to the cover body and configured to hold the fuel pipe. The clip includes a clamp portion and a grip portion. The clamp portion is disposed inside the cover body and configured to hold the fuel pipe. The grip portion is coupled to the clamp portion and exposed to an outside of the cover body.

6 Claims, 5 Drawing Sheets

SOUNDPROOF COVER FOR FUEL PIPE

This application claims the entire benefit of International Patent Application No. PCT/JP2013/073330 filed on Aug. 30, 2013, the entirety of which is incorporated by reference.

BACKGROUND

Technical Field

The present invention relates to a soundproof cover for a fuel pipe for mounting to a fuel pipe of an automobile.

Related Art

A fuel pipe of an automobile wears a cover for the purpose of protecting and sound proofing. For example, Japanese Patent Application Publication No. 2005-282836 discloses a protector that is put on a resin tube as a fuel pipe. The protector is integrally formed of a protector body, which is put on the outer periphery of the resin tube, and a positioning fixing part, which is disposed at the end of the protector body, using polypropylene or the like. On the other hand, in the case of the cover for sound proofing, the cover body is constituted of foam such as urethane, and a resin clip for holding the fuel pipe is integrally coupled inside the cover body.

In the case of the latter soundproof cover, when the cover body is pulled by a hand to remove it from the fuel pipe, the cover body may be possibly damaged because the adhesion strength of the clip and the cover body is low compared with the pipe removal load.

Therefore, it is an object of the present invention to provide a soundproof cover for a fuel pipe with higher reliability that allows removal of the soundproof cover for the fuel pipe from the fuel pipe without possibility of damaging the cover body.

SUMMARY

A first aspect of the invention provides a soundproof cover for a fuel pipe includes a cover body and a clip. The cover body covers a fuel pipe. The clip is coupled to the cover body and configured to hold the fuel pipe. The clip includes a clamp portion and a rip portion. The clamp portion is disposed inside the cover body and configured to hold the fuel pipe. The grip portion is coupled to the clamp portion and exposed to an outside of the cover body.

In a second aspect of the invention according to the first aspect, the cover body includes a positioning depressed portion configured to position the clamp portion on the inner surface.

In a third aspect of the invention according to the first and second aspects, the clamp portion and the grip portion are formed independently to couple one another over the cover body.

In a fourth aspect of the invention according to the third aspect, the cover body is precompressed in a state where the clamp portion and the grip portion are coupled one another.

A fifth aspect of the invention provides a soundproof cover for a fuel pipe that includes a cover body and a clip. The cover body covers a fuel pipe. The clip is coupled to the cover body and configured to hold the fuel pipe. The clip includes a clamp portion and a grip portion. The clamp portion is disposed inside the cover body and configured to hold the fuel pipe. The grip portion is formed independently from the clamp portion and coupled to the clamp portion over the cover body to be exposed to an outside the cover body. The clamp portion includes a cylindrical portion and a protrusion. The cylindrical portion has a penetration hole at an upper center portion of the clamp portion in a state where the cover body is placed at the upper side. The protrusion has a cone-shaped tapered portion at a top portion of the protrusion and is circularly disposed on the inner peripheral surface of the penetration hole. The grip portion includes a boss that protrudes downward from the inferior surface center of the grip portion and forms a slit in a diametrical direction and a barb on the distal end outer periphery. In a state where the cylindrical portion of the clamp portion is inserted into a through hole disposed to the cover body from the lower side of the cover body, the boss of the grip portion is inserted into the penetration hole of the cylindrical portion from the upper side of the cover body to lock the barb to the protrusion such that the clamp portion and the grip portion are coupled one another over the cover body, and the inferior surface of the boss is in contact with the fuel pipe in a state where the clamp portion holds the fuel pipe.

With the first aspect of the invention, the soundproof cover allows to be removed from the fuel pipe without the possibility of damaging the cover body, and the soundproof cover has higher reliability.

With the second aspect of the invention, in addition to the effect of the first aspect, since the positioning depressed portion is disposed, the clamp portion is positioned properly inside the cover body.

With the third aspect of the invention, in addition to the effect of the first and second aspects, the deformation of the cover body is not necessary in attaching the clip to the cover body, thus eliminating the possibility such as breaking the cover body.

With the fourth aspect of the invention, in addition to the effect of the third aspect, even if the coupling portion between the clamp portion and the grip portion has a gap, the gap is absorbed and the clip is preferably integrated to the cover body without rattling.

BRIEF DESCRIPTION OF DRAWINGS

FIG. 2A is a front view, FIG. 2B is a plan view, FIG. 2C is a bottom plan view, and FIG. 2D is a right-side view.

FIG. 3A is a cross-sectional view taken along the line A-A, and FIG. 3B is a cross-sectional view taken along the line B-B.

FIG. 4A is a front view, FIG. 4B is a plan view, and FIG. 4C is a cross-sectional view taken along the line C-C.

FIG. 5A is a front view, FIG. 5B is a plan view, FIG. 5C is a bottom plan view, and FIG. 5D is a right-side view.

DETAILED DESCRIPTION

Figure 1:
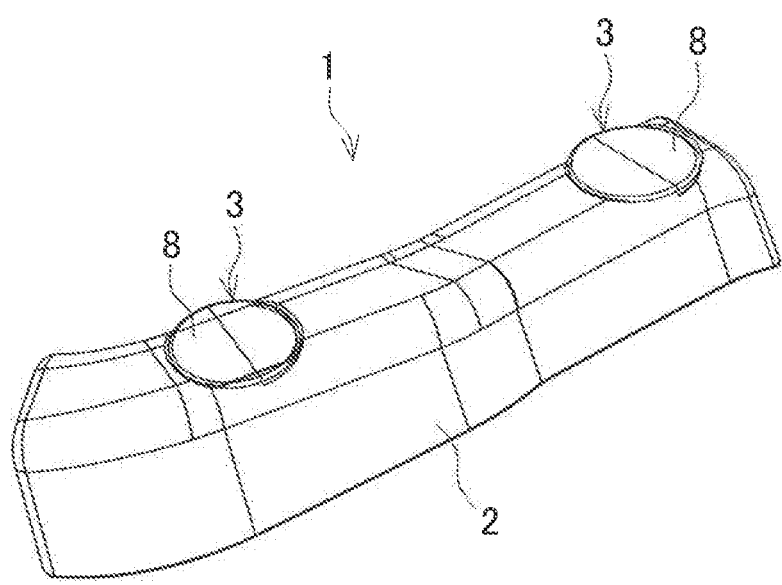
FIG. 1 is a perspective view of a soundproof cover for a fuel pipe.
Figure 2B:
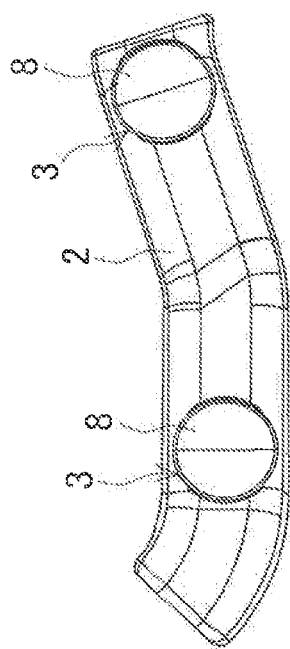
FIGS. 2A to 2D are explanatory views of the soundproof cover for the fuel pipe.
Figure 2A:
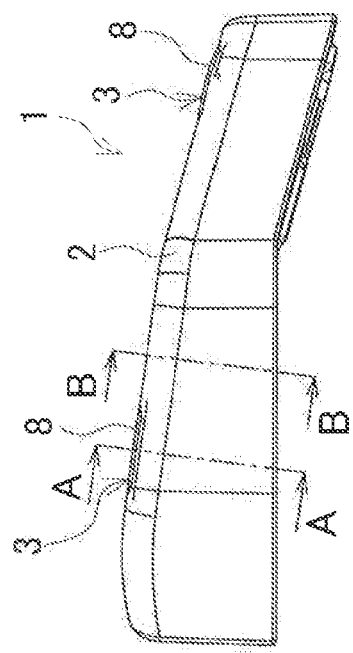
Figure 2C:
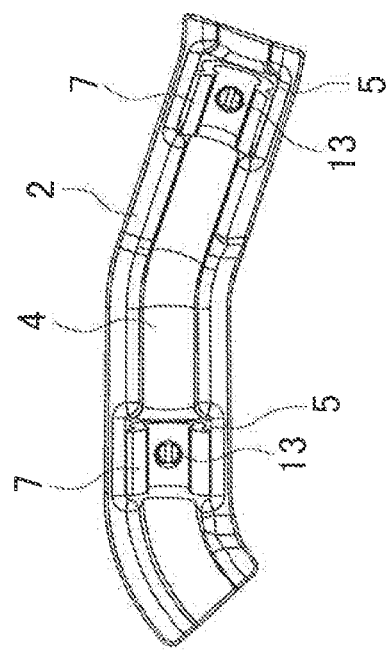
Figure 2D:
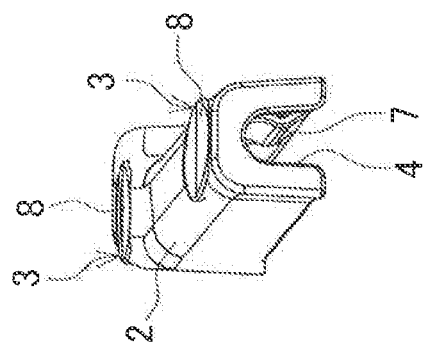
Figure 3A:
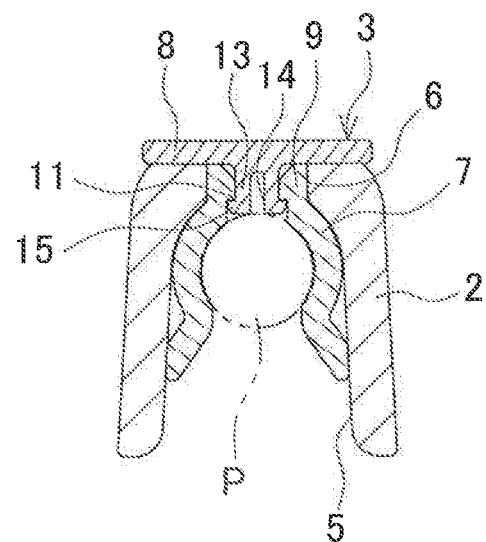
FIGS. 3A and 3B are cross-sectional views.
Figure 3B:
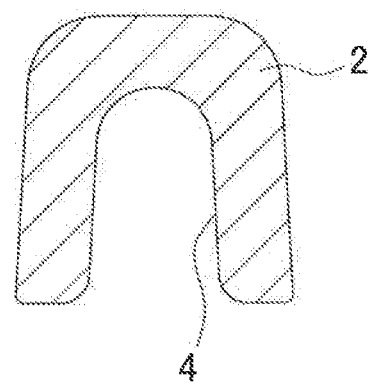

The following describes one embodiment of the present invention based on the drawings. FIG. 1 is an exemplary perspective view of a soundproof cover for a fuel pipe (hereinafter abbreviated as a soundproof cover), FIGS. 2A to 2D are explanatory views of the soundproof cover, and FIGS. 3A and 3B are cross-sectional views taken along the line A-A and the line B-B respectively. A soundproof cover 1 includes a cover body 2 and clips 3 and 3 that are arranged at two positions on the cover body 2. The cover body 2 is formed by bending along a metallic fuel pipe. The cover body 2 is a foam (here, urethane) with a U-shaped lateral cross section including a groove 4 over the whole length. The mounting positions for the clips 3 and 3 in the groove 4 are in positioning depressed portions 5 and 5 where the width and the depth of the groove are enlarged. The bottom parts of the positioning depressed portion 5 each include a through hole 6.

Figure 4B:
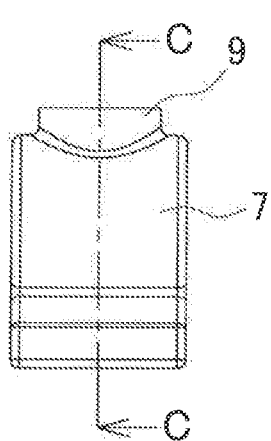
FIGS. 4A to 4C are explanatory views of a clamp portion.
Figure 4A:
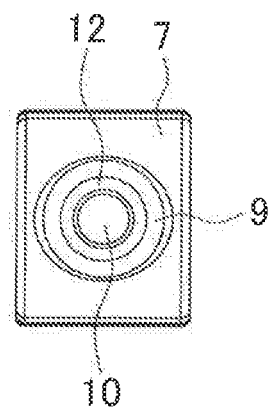
Figure 4C:
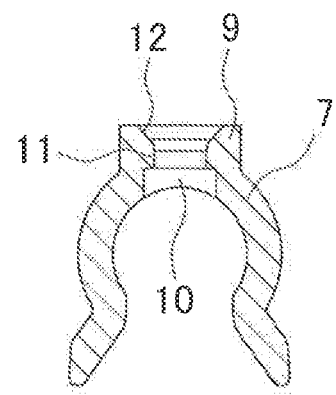
Figure 5B:
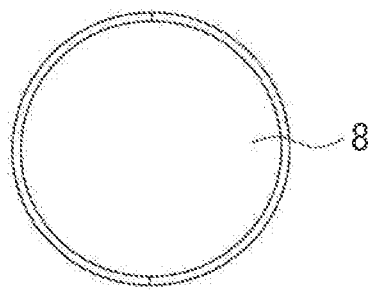
FIGS. 5A to 5D are explanatory views of a grip portion.
Figure 5A:
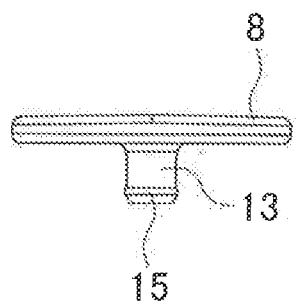
Figure 5D:
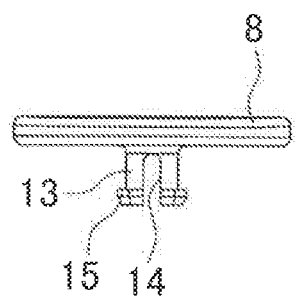
Figure 5C:
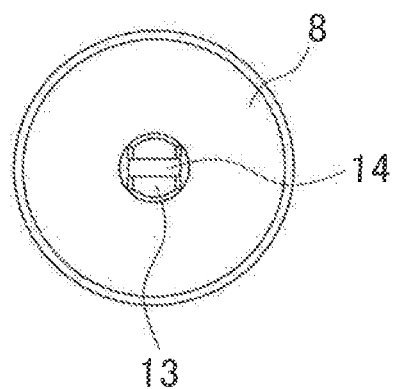

The clip 3 includes a clamp portion 7, which is disposed inside the cover body 2 (inside the groove 4), and a grip portion 8, which is coupled to the clamp portion 7 and exposed to outside (the plane side) of the cover body 2. First, as illustrated in FIGS. 4A to 4C, the clamp portion 7 is a C-shaped plate body made of resin with both ends folded outward. The clamp portion 7 has a cylindrical portion 9 with a penetration hole 10 at the upper center portion. On the inner peripheral surface of the penetration hole 10, a protrusion 11 is circularly disposed. The protrusion 11 has a cone-shaped tapered portion 12 at the top portion. On the other hand, as illustrated in FIGS. 5A to 5D, the grip portion 8 is a disk-shaped part made of resin, and on the inferior surface center of the grip portion 8, a boss 13 with a slit 14 in a diametrical direction is disposed to protrude. The boss 13 has a barb 15 on the distal end outer periphery. The outer diameter of the boss 13 is slightly smaller than the inner diameter of the penetration hole 10 of the clamp portion 7 that is narrowed down by the protrusion 11.

As illustrated in FIG. 3A, the soundproof cover 1 constituted as described above is configured such that the clamp portion 7 is disposed in the positioning depressed portion 5 of the cover body 2 in a direction that a central axis of the C-shape is parallel to the center of the groove 4, and the cylindrical portion 9 is inserted into the through hole 6 from the lower side. In the above state, when the boss 13 of the grip portion 8 is inserted into the penetration hole 10 of the cylindrical portion 9 from the upper side of the cover body 2, a distal end of the boss 13 is guided at the tapered portion 12 of the protrusion 11 to contract elastically. Then, the boss 13 passes through the protrusion 11. When the barb 15 passes over the protrusion 11, the boss 13 elastically returns to lock the barb 15 to an inferior surface of the protrusion 11. Then, the boss 13 is snap-fit coupled to the cylindrical portion 9 in a pull-out preventing state. Accordingly, the clamp portion 7 is coupled to the grip portion 8 over the cover body 2, and the clip 3 is integrated to the cover body 2. In this state, the grip portion 8 is exposed on a top surface of the cover body 2.

In the above case, the clamp portion 7 fits inside the positioning depressed portion 5 of the cover body 2. Therefore, the central axis of the C-shape is held in a direction parallel to the center of the groove 4. The cylindrical portion 9 has a height smaller than a length of the through hole 6 of the cover body 2 (the thickness of the cover body 2). Then, in a state where the clamp portion 7 is coupled to the grip portion 8, the cover body 2 is precompressed between an outer surface of the clamp portion 7 and an inferior surface of the grip portion 8. Therefore, the clip 3 is prevented from rattling if the coupling portion has a gap. Furthermore, the snap-fit coupling of the clamp portion 7 and the grip portion 8 is designed such that a removal load between the clamp portion 7 and the grip portion 8 is larger than a removal load between the clamp portion 7 and the fuel pipe.

Accordingly, when the soundproof cover 1 is mounted to the fuel pipe, the cover body 2 is placed to the fuel pipe so as to cause the fuel pipe to fit to the groove 4 of the cover body 2. This allows the fuel pipe to be in contact with the clamp portions 7 of each of the clips 3. Then, when the clip 3 is pushed in this state, as illustrated in FIG. 3A, the clamp portion 7 holds a fuel pipe P. Therefore, the cover body 2 is mounted along the fuel pipe P via the clips 3 and 3. On the other hand, when the soundproof cover 1 is removed, the grip portion 8 exposed on the top surface of the cover body 2 is gripped to pull the clip 3. Then, because of setting of the above-described removal load, the clamp portion 7 is removed from the fuel pipe P. At this time, there is not the possibility such as breaking the cover body 2 due to the load because the cover body 2 is not pulled directly.

Thus, according to the soundproof cover 1 with the above-described configuration, the clip 3 is constituted of the clamp portion 7, which is disposed inside the cover body 2 and configured to hold the fuel pipe P, and the grip portion 8, which is coupled to the clamp portion 7 and exposed to the outside the cover body 2. Therefore, the soundproof cover has higher reliability that allows the removal from the fuel pipe P without the possibility of damaging the cover body 2. Especially, in this embodiment, since the clip 3 as an independent body is attached to the formed cover body 2, there is no concern that the cover body 2 attaches to the clip 3 as in the case of integrally molded. Accordingly, the possibility, such as breaking the cover body 2 in releasing from a mold, is eliminated.

The cover body 2 includes the positioning depressed portion 5 configured to position of the clamp portion 7 on the inner surface. Therefore, the clamp portion 7 is positioned properly inside the cover body 2. Furthermore, the clamp portion 7 and the grip portion 8 are formed independently to couple one another over the cover body 2. Then, the deformation of the cover body 2 is not necessary in attaching the clip 3 to the cover body 2. Accordingly, the possibility such as breaking the cover body 2 is eliminated. Then, since the cover body 2 is precompressed in the state where the clamp portion 7 and the grip portion 8 are coupled one another, gap is absorbed even if the coupling portion has the gap. Then, the clip 3 is preferably integrated to the cover body 2 without rattling.

While in the above-described configuration, the cover body includes two clips, the number of clips may be one, or equal to or more than three. While in the snap-fit coupling of the clamp portion and the grip portion, the clamp portion side is the cylindrical portion and the grip portion side is the boss, both portions may be inverted each other. Obviously not limited to the snap-fit coupling, other configurations may be employed insofar as both components are connectable one another. Furthermore, the structures of the clamp portion and the grip portion are not limited to the above-described configuration. Especially, the grip portion is not limited to disk-shaped insofar as the grip portion is graspable from outside the cover body. The grip portion may include a cutout on the outer periphery, and may be square-shaped, polygonal-shaped or the like. The grip portion may include a protrusion for easy grip. Then, according to the shape of the grip portion, the clip is not necessarily constituted of two components. Insofar as the grip portion is attachable to the cover body, the grip portion integrated to the clamp portion may be employed.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A soundproof cover for a fuel pipe comprising:
 a cover body having a groove and configured to cover the fuel pipe; and
 a clip coupled to the cover body and configured to hold the fuel pipe, wherein
 the clip includes a clamp portion and a grip portion, the clamp portion being disposed inside the cover body and configured to hold the fuel pipe, the grip portion being coupled to the clamp portion and exposed to an outside of the cover body, wherein
 the cover body includes a positioning depressed portion configured to position the clamp portion within the groove, wherein
 the positioning depressed portion is defined by opposing side-walls of the groove, and wherein
 the outer surface of the clamp portion contacts inner surfaces of the opposing side-walls when the clamp portion is positioned within the positioning depressed portion.

2. The soundproof cover for the fuel pipe according to claim 1, wherein
 the clamp portion and the grip portion are formed independently to couple one another over the cover body.

3. The soundproof cover for the fuel pipe according to claim 2, wherein
 the cover body is precompressed in a state where the clamp portion and the grip portion are coupled one another.

4. The soundproof cover for the fuel pipe according to claim 1, wherein
 the grip portion has a larger width than the clamp portion in the width direction of the cover body.

5. The soundproof cover for the fuel pipe according to claim 1, wherein
 a removal load between the clamp portion and the grip portion is configured to be larger than a removal load between the clamp portion and the fuel pipe.

6. A soundproof cover for a fuel pipe comprising:
 a cover body configured to cover the fuel pipe; and
 a clip coupled to the cover body and configured to hold the fuel pipe, wherein
 the clip includes a clamp portion and a grip portion, the clamp portion being disposed inside the cover body and configured to hold the fuel pipe, the grip portion being formed independently from the clamp portion and coupled to the clamp portion over the cover body to be exposed to an outside the cover body,
 the clamp portion includes a cylindrical portion and a protrusion, the cylindrical portion having a penetration hole at an upper center portion of the clamp portion in a state where the cover body is placed at the upper side, the protrusion having a cone-shaped tapered portion at a top portion of the protrusion and being circularly disposed on the inner peripheral surface of the penetration hole,
 the grip portion includes a boss protruding downward from the inferior surface center of the grip portion and forming a slit in a diametrical direction and a barb on the distal end outer periphery,
 in a state where the cylindrical portion of the clamp portion is inserted into a through hole disposed to the cover body from the lower side of the cover body, the boss of the grip portion is inserted into the penetration hole of the cylindrical portion from the upper side of the cover body to lock the barb to the protrusion such that the clamp portion and the grip portion are coupled one another over the cover body, and the inferior surface of the boss is configured to contact the fuel pipe in a state where the clamp portion holds the fuel pipe.

* * * * *